United States Patent
Borthakur et al.

(10) Patent No.: US 10,118,802 B2
(45) Date of Patent: Nov. 6, 2018

(54) STRUCTURAL HEALTH MONITORING OF AN ESCALATOR DRIVE SYSTEM

(71) Applicant: Otis Elevator Company, Farmington, CT (US)

(72) Inventors: Soumitra Borthakur, Rocky Hill, CT (US); Randall Keith Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/516,708

(22) PCT Filed: Oct. 28, 2015

(86) PCT No.: PCT/US2015/057791
§ 371 (c)(1),
(2) Date: Apr. 4, 2017

(87) PCT Pub. No.: WO2016/069734
PCT Pub. Date: May 6, 2016

(65) Prior Publication Data
US 2017/0297874 A1  Oct. 19, 2017

Related U.S. Application Data

(60) Provisional application No. 62/073,383, filed on Oct. 31, 2014.

(51) Int. Cl.
*B66B 25/00* (2006.01)
*B66B 21/00* (2006.01)
(Continued)

(52) U.S. Cl.
CPC ............ *B66B 25/006* (2013.01); *B66B 23/02* (2013.01); *F16H 7/00* (2013.01); *F16H 57/01* (2013.01)

(58) Field of Classification Search
None
See application file for complete search history.

(56) References Cited

U.S. PATENT DOCUMENTS

| 5,647,640 A | 7/1997 | Heintzmann et al. |
| 6,131,727 A * | 10/2000 | Nelson .................. B65G 43/02 198/810.02 |

(Continued)

FOREIGN PATENT DOCUMENTS

| CN | 101397113 | 4/2009 |
| CN | 101948045 | 1/2011 |

(Continued)

OTHER PUBLICATIONS

"Bernstein Your partner for elevator and escalator technology", www.bernestein.eu; 6 pages.

(Continued)

*Primary Examiner* — Kavel Singh
(74) *Attorney, Agent, or Firm* — Cantor Colburn LLP

(57) ABSTRACT

A structural health monitoring system is provided. The system includes a drive system having a first drive member a second drive member 38 operationally connected to the first drive member, and a tension member 39 operationally connecting the first drive member to the second drive member. At least one sensor 50 is configured to monitor a characteristic of at least one of the first drive member and the second drive member. A processor 54, in communication with the at least one sensor, is configured to determine if the structural health of the tension member is compromised based on the monitored characteristic. The processor is further configured to perform a safety response action when the structural health of the tension member is determined to be compromised.

14 Claims, 5 Drawing Sheets

(51) Int. Cl.
  *B65G 43/02* (2006.01)
  *B66B 23/02* (2006.01)
  *F16H 7/00* (2006.01)
  *F16H 57/01* (2012.01)

(56) References Cited

U.S. PATENT DOCUMENTS

| | | | |
|---|---|---|---|
| 6,267,219 | B1 | 7/2001 | Spannhake et al. |
| 7,494,004 | B2 | 2/2009 | Stolyar et al. |
| 7,497,315 | B2 | 3/2009 | Fargo et al. |
| 7,779,994 | B1 * | 8/2010 | Travis .................... B65G 43/02 198/810.01 |
| 8,328,005 | B2 * | 12/2012 | King ...................... B65G 43/00 198/810.04 |
| 8,636,140 | B2 | 1/2014 | Tout et al. |
| 2008/0164119 | A1 | 7/2008 | Alemany et al. |
| 2010/0060677 | A1 | 3/2010 | Jones et al. |
| 2010/0222920 | A1 | 9/2010 | Andreoli |
| 2013/0220776 | A1 | 8/2013 | Depaso |

FOREIGN PATENT DOCUMENTS

| | | |
|---|---|---|
| CN | 102034149 | 4/2011 |
| CN | 104030137 A | 9/2014 |
| EP | 2774886 | 9/2014 |
| JP | 4305342 | 7/2009 |
| JP | 4791093 | 10/2011 |

OTHER PUBLICATIONS

"Escalators—Technical Features—Finished and Optionals", Tecno Elevation Technology, [Retreived from the Internet Apr. 3, 2017] http://www.tecno-lift.com/english/escalators/technical-features.htm; 2 pages.

International Written Opinion and Search Report, International Application No. PCT/US2015/057791, dated Jan. 6, 2016, Korean Intellectual Property Office; International Written Opinion 5 pages, Search Report 4 pages.

Tsutada, et al. "Chain Fault Detection of Escalator Using Handrail Vibration", 14th International Congress on Sound & Vibration; Cairns, AU; Jul. 9-12, 2007; 7 pages.

Chinese Office Action; CN Application No. 201580059002.0, dated May 23, 2018; State Intellectual Property Office, P.R. China, Translation of Office Action 16 pages; CN Office Action 9 pages.

\* cited by examiner

STRUCTURAL HEALTH MONITORING OF AN ESCALATOR DRIVE SYSTEM

CROSS REFERENCE TO RELATED APPLICATIONS

This is a U.S. National Stage of Application No. PCT/US2015/057791, filed on Oct. 28, 2015, which claims the benefit of U.S. Provisional Patent Application No. 62/073,383, filed Oct. 31, 2014, the disclosures of which are incorporated herein by reference.

BACKGROUND OF THE INVENTION

Drive systems employ operational components that suffer from wear and tear resulting in fatigue and other diminished structural health aspects. An example of a structural system employing a drive system is an escalator. Escalators are a type of passenger conveyors that typically carries passengers between landings at different levels in buildings. An escalator is formed as a series of steps which is typically driven using a motorized drive system having a drive chain to interconnect a drive and driven sprocket. Wear and fatigue may lead to a failure of the drive system.

In order to avoid such a failure, inspectors and/or technicians occasionally inspect the drive system to determine if there is any structural deterioration in the system that may indicate potential system failure. The inspectors rely on many repeated inspections which include visual inspection and possibly length measurement of the drive chain. Such a visual and manual process is prone to human error because it is subjective, i.e., the measurement made by a human inspector does not produce a discrete result (yes/no) but rather is usually a subjective measurement of a component of the system. Further, even with accurate measuring tools, determining the threshold of a failing system may be a subjective inquiry.

BRIEF DESCRIPTION OF THE INVENTION

According to one embodiment, a structural health monitoring system is provided. The system is applied to a drive system having a first drive member, a second drive member operationally connected to the first drive member, and a tension member operationally connecting the first drive member to the second drive member. At least one sensor is configured to monitor a characteristic of at least one of the first drive member and the second drive member. A processor, in communication with the at least one sensor, is configured to determine if the structural health of the tension member is compromised based on the monitored characteristic. The processor is further configured to perform a safety response action when the structural health of the tension member is determined to be compromised.

In addition to one or more of the features described above, or as an alternative, further embodiments may include at least one additional sensor configured to monitor a characteristic of the other of the first drive member and the second drive member. Further, the processor may be configured to monitor a transfer function, the ratio of output to input spectral energies, between the first and second drive members to determine if the structural health of the tension member is compromised. In some embodiments, at least one sensor is disposed on or located proximal to the respective first drive member or second drive member. In some embodiments that include multiple sensors, the sensors may be located on or proximal to the respective drive members.

In some embodiments, a motor is operationally connected to at least one of the first drive member and the second drive member.

In addition to one or more of the features described above, or as an alternative, in some embodiments, the first drive member and the second drive member may each comprise a sheave, a pulley, a gear, a wheel, a sprocket, a cog, or a pinion. Additionally, in some embodiments, the tension member may comprise a chain, a belt, a cable, a ribbon, a band, or a strip. Furthermore, in some embodiments, at least one sensor may comprise an accelerometer, a resistance temperature detector, a thermocouple, a non-contact eddy current probe displacement sensor, a contact linear variable displacement transducer, a velocity sensor, a strain sensor, a load sensor, a pressure sensor, a microphone, or a non-contact chain vibration measurement device.

In addition to one or more of the features described above, or as an alternative, in some embodiments, the safety response action may comprise at least one of powering off the drive system, providing a displayed notification on a display screen, transmitting a notice to an external device, and providing an indicator light and/or sound indicating that the structural health of the drive system is compromised. Also, in some embodiments, the processor and the at least one sensor form a single device. Moreover, in some embodiments, the system is a drive system for an escalator, moving walk, or other passenger conveying system.

According to another embodiment, a method of monitoring the structural health of a drive system is provided. The method includes measuring a characteristic of a drive member of a drive system, determining if the structural health of the drive system is compromised based on the measured characteristic, and performing a safety response action when it is determined that the structural health of the drive system is compromised.

In addition to one or more of the features described above, or as an alternative, further embodiments may include that the determining step comprises comparing the measured characteristic to a known quantity representative of a healthy system. In some such embodiments, the known quantity may be analytically determined. Further, in some embodiment, the known quantity is a measured characteristic of the structural health of the drive system when the drive system is known to be healthy.

In addition to one or more of the features described above, or as an alternative, in some embodiments, the drive member is a first drive member, the method further includes monitoring a characteristic of a second drive member, and the determining step is based on the measured characteristics of the first and second drive members. Further, in some embodiments, the determining step comprises monitoring a transfer function between the first drive member and the second drive member, based on the monitored characteristics, to determining if the structural health of the drive system is compromised.

In addition to one or more of the features described above, or as an alternative, in some embodiments, the safety response action comprises at least one of powering off the drive system, providing a displayed notification on a display screen, transmitting a notice to an external device, and providing an indicator light and/or sound indicating that the structural health of the drive system is compromised. Moreover, in some embodiments, the method is performed by a structural health monitoring system of an escalator, moving walk, or other passenger conveying system.

According to another embodiment, a structural health monitoring system includes a drive system having a first drive member, a second drive member operationally connected to the first drive member, and a tension member operationally connecting the first drive member to the second drive member. The system also includes at least one first sensor configured to monitor a characteristic of the first drive member and at least one second sensor configured to monitor a characteristic of the second drive member. A processor is in communication with the first and second sensors and is configured to measure and monitor a transfer function between the first and second drive members to determine if the structural health of the drive system is compromised.

In addition to one or more of the features described above, or as an alternative, in some embodiments, the processor is configured to perform a safety response action when the structural health of the drive system is determined to be compromised. Further, in some embodiments, the drive system is a drive system for an escalator, moving walk, or other passenger conveying system.

According to another embodiment, a method of monitoring the structural health of a drive system is provided. The drive system includes a first drive member, a second drive member, and a tension member operationally connecting the first and second drive members. The method includes measuring a characteristic of at least one of the first and second drive members, determining if the structural health of the tension member is compromised based on the measured characteristic, and performing a safety response action when it is determined that the structural health of the tension member is compromised.

In addition to one or more of the features described above, or as an alternative, in some embodiments, the measuring step comprises measuring a transfer function between the first drive member and the second drive member based on the measured characteristic. Further, in some embodiments, the determining step comprises comparing the measured characteristic to a known quantity. Moreover, in some embodiments, the known quantity is analytically determined. In some embodiments, the known quantity is a measured characteristic of the structural health of the tension member when the tension member is known to be healthy.

Technical effects of embodiments of the invention include providing an objective monitoring system to determine if system failure of a drive system is possible. Other technical effects include providing a mathematical determination regarding the structural health of a system, and further a mathematical determination regarding failure and/or approaching failure of such system to permit preventive maintenance of the system. Further, real-time, continuous monitoring is provided to enhance safety. Moreover, an immediate response to potential system failure is provided by some embodiments of the invention. In addition, this health monitoring system, which is an active system, can detect its own health and provide a signal to show that it is healthy and active, i.e., the system can provide information and notices regarding the status of the monitoring system itself.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
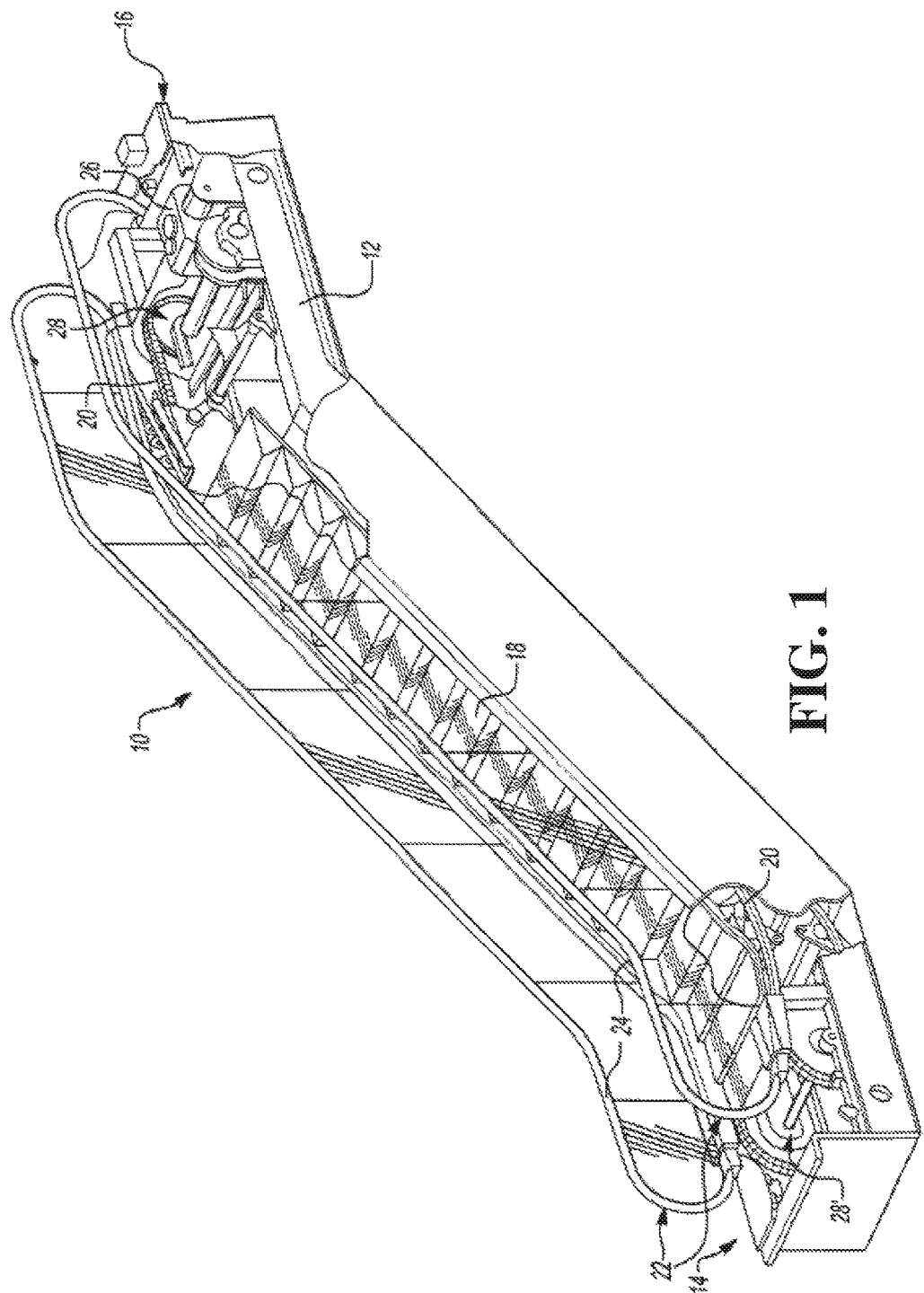
FIG. 1 is a schematic illustration of an exemplary escalator system employing embodiments of the invention.

FIG. 1 illustrates an escalator system 10. It should become apparent in the ensuing description that the invention is applicable to other passenger conveyors, such as moving walks. The escalator system 10 generally includes a truss 12 extending between a lower landing 14 and an upper landing 16. A plurality of sequentially connected tread plates or steps 18 are connected to a step chain 20 and travel through a closed loop path within the truss 12. A pair of balustrades 22 includes moving handrails 24. A drive machine 26, or drive system, is typically located in a machine space 28 under the upper landing 16; however, an additional machine space 28' can be located under the lower landing 14. The drive machine 26 is configured to drive the tread plates 18 and/or handrails 24 through the step chain 20. The drive machine 26 operates to move the tread plates 18 in a chosen direction at a desired speed under normal operating conditions.

Figure 2:
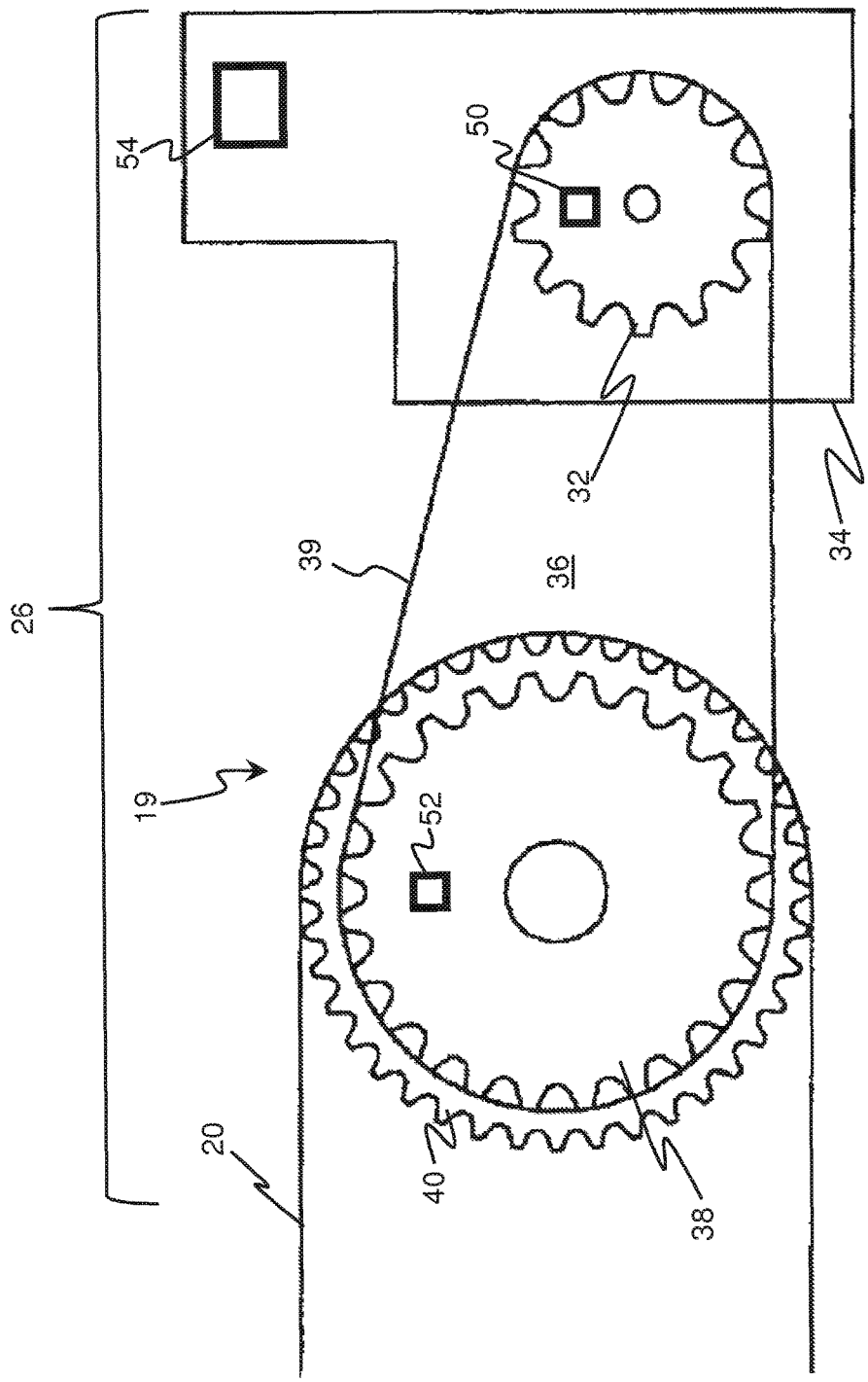
FIG. 2 is a schematic illustration of selected components of the escalator system of FIG. 1, in accordance with an exemplary embodiment of the invention.

The tread plates 18 make a 180 degree heading change in a turn-around area 19 located under the lower landing 14 and upper landing 16. The tread plates 18 are pivotally attached to the step chain 20 and follow a closed loop path of the step chain 20, running from one landing to the other, and back again. Referring to FIG. 2, the drive machine 26 includes a first drive member 32, such as motor output sheave, connected to a drive motor 34 through a belt reduction assembly 36 including a second drive member 38, such as an output sheave, driven by a tension member 39, such as an output belt. The first drive member 32 in some embodiments is a driving member, and the second drive member 38 is a driven member.

As used herein, the first drive member 32 and/or the second drive member, in various embodiments, may be any type of rotational device, such as a sheave, pulley, gear, wheel, sprocket, cog, pinion, etc. The tension member 39, in various embodiments, can be configured as a chain, belt, cable, ribbon, band, strip, or any other similar device that operatively connects two elements to provide a driving force from one element to another. For example, the tension member 39 may be any type of interconnecting member that extends between and operatively connects the first drive member 32 and a second drive member 38. In some embodiments, as shown in FIG. 1, the first drive member 32 and the second drive member may provide a belt reduction. For example, first drive member 32 may be approximately 75 mm (2.95 inches) in diameter while the second drive member 38 may be approximately 750 mm (29.53 inches) in diameter. The belt reduction, for example, allows the replacement of sheaves to change the speed for 50 or 60 Hz electrical supply power applications, or different step speeds. However, in other embodiments the second drive member 38 may be substantially similar to the first drive member 32.

As noted, the first drive member 32 is driven by drive motor 34 and thus is configured to drive the tension member 39 and the second drive member 38. In some embodiments the second drive member 38 may be an idle gear or similar device that is driven by the operative connection between the first drive member 32 and the second drive member 38 by means of tension member 39. The tension member 39 travels around a loop set by the first drive member 32 and the second drive member 38, which herein after may be referred to as a small loop. The small loop is provided for driving a larger loop which consists of the step chain 20, and is driven by an output sheave 40, for example. Under normal operating conditions, the tension member 39 and the step chain 20 move in unison, based upon the speed of movement of the first drive member 32 as driven by the drive motor 34.

Although described herein as a particular escalator drive system and particular components, this is merely exemplary, and those of skill in the art will appreciate that other escalator system configurations may operate with the invention disclosed herein.

The elements and components of escalator 10 may suffer from fatigue, wear and tear, or other damage such that the structural health of the escalator, and the operating components, may fail. One component that may suffer failure, or may be used to indicate deteriorating operation conditions, is the tension member 39. In order to prevent failure, a structural health monitoring system is configured with the drive machine 26 to prevent failure of the tension member 39.

Referring to FIG. 2, the drive machine 26 includes one or more sensors 50 and 52 in connection with a processor 54 that are configured to provide an indication of an undesirable operating condition of the drive machine 26. Undesirable operating conditions are conditions that indicate that the structural health of the system is compromised or deteriorating and/or indicate a failure or potential failure of the drive machine 26. Hereinafter undesirable operating conditions will be referred to as unhealthy operating conditions and/or an unhealthy system and healthy operating conditions and/or a healthy system is a system that does not exhibit evidence of potential failure and/or does not suffer from structural defects and/or deterioration. For example, in a healthy system the tension member 39 will be taut and operate smoothly and in an unhealthy system the tension member may be loose in its connection with the drive members 32 and 38.

As noted, failure in the drive machine 26 may result from failure of the tension member 39. Accordingly, it is advantageous to monitor the structural health of the tension member 39. However, because the tension member 39 may be configured as a belt, chain, or other similar component, attaching sensors or other monitoring devices to the tension member 39 may be difficult or not feasible. In an effort to provide a real-time, continuous, and/or objective monitoring system of the structural health of the tension member 39, it was recognized that monitoring characteristics of the drive member(s) 32, 38 would enable accurate and real time information regarding the structural health of the tension member 24.

A first sensor 50 is associated with the first drive member 32 and a second sensor 52 is associated with the second drive member 38. The sensors 50 and 52 may be accelerometers that are physically attached and/or connected to the drive members 32 and 38, respectively. Accordingly, operational characteristics, such as rotational speed, acceleration, stability, wobble, and/or other characteristics of the drive member(s) may be monitored. The sensors 50 and 52 may further communicate with and transmit signals to a processing chip or processor 54, such as an on-board Digital Signal Processor, CPU, and/or other type of processing or computing chip. The communication between the sensors 50 and 52 and the processor 54 may be by wired and/or wireless communication, or, in some embodiments, the processor and the sensor may be formed as a single device.

As configured, processor 54 is configured to actively and/or continuously monitor the structural health of the drive machine 26. By processing the signals provided by sensors 50 and 52, the processor 54 can monitor the health of the drive machine 26 and perform a safety response action or instruct other components to perform a safety response action if an unhealthy operating condition is detected or determined. The processor 54 is configured to determine or measure a baseline measurement from the sensors 50, 52, for example, a healthy operating condition such as a waveform representation of healthy operating conditions can be determined. The processor can then monitor for unhealthy operating conditions based on this baseline, as described below, and provide the safety response action.

The safety response action may be an active action, such as a power shut-down operation for the drive machine 26 and/or activation of an auxiliary drive system and/or brake. Alternatively, the safety response action may be passive, such as providing a notification or alert to a remote system or on a display screen at or near the drive machine 26, to indicate that the system is operating under unhealthy operating conditions and should be investigated and/or repaired. The safety response action may also include alerting noises and/or sounds to notify users of the safety response action.

Figure 3:
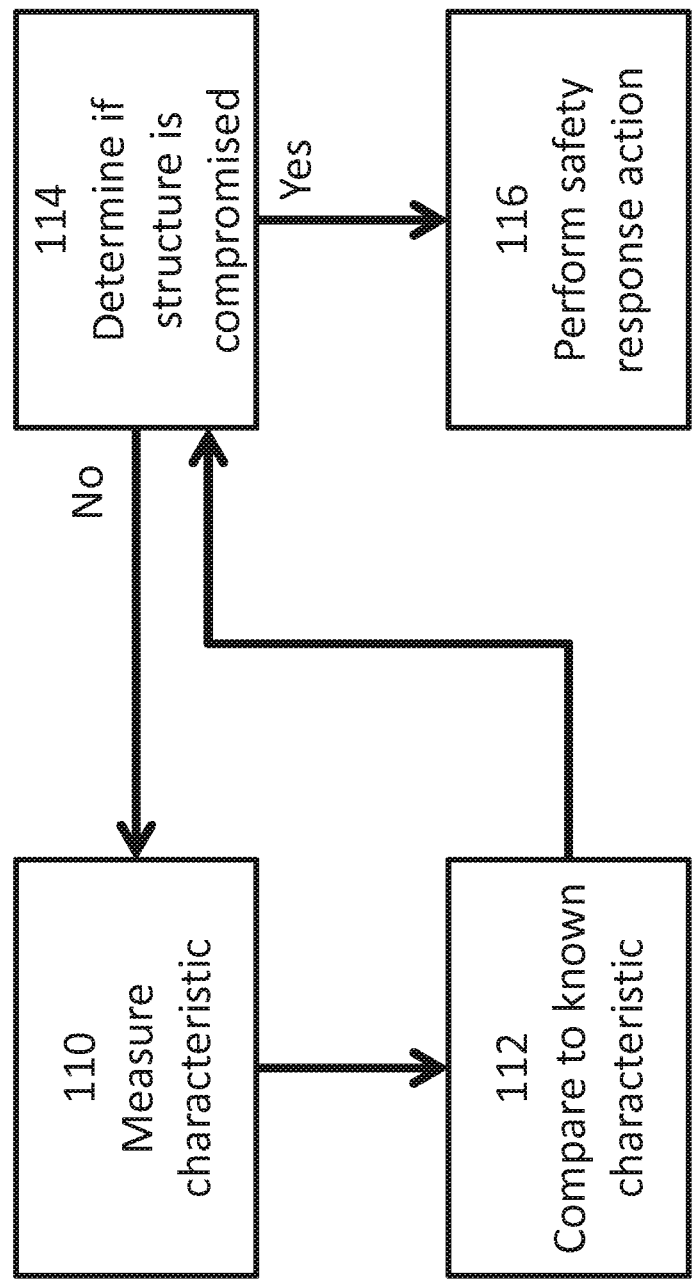
FIG. 3 is a flow chart of a process of monitoring the structural health of a drive member in accordance with an exemplary embodiment of the invention.

Turning now to FIG. 3, a flow chart of a process of monitoring the structural health of a drive member in accordance with embodiments of the invention is shown. At step 110 one or more sensors monitor the structural health of a tension member by measuring one or more characteristics of a drive member to which the tension member is operationally coupled. For example, at step 110, the measured characteristic may be a computed transfer function between two rotating members with a tension member operatively coupled therebetween. At step 112, a processor compares the measured characteristic against a known characteristic, such as a known quantity, known waveform, etc., as explained below. For example, at step 112, the processor may monitor for deviation from normal operating conditions. At step 114, the processor determines if the comparison of the measured characteristic with the known quantity indicates that the structural health of the tension member is compromised. If it is determined that the structural health is not compromised, the process begins again at step 110. However, if it is determined that the structural health is compromised, the processor performs a safety response action at step 116.

Figure 4:
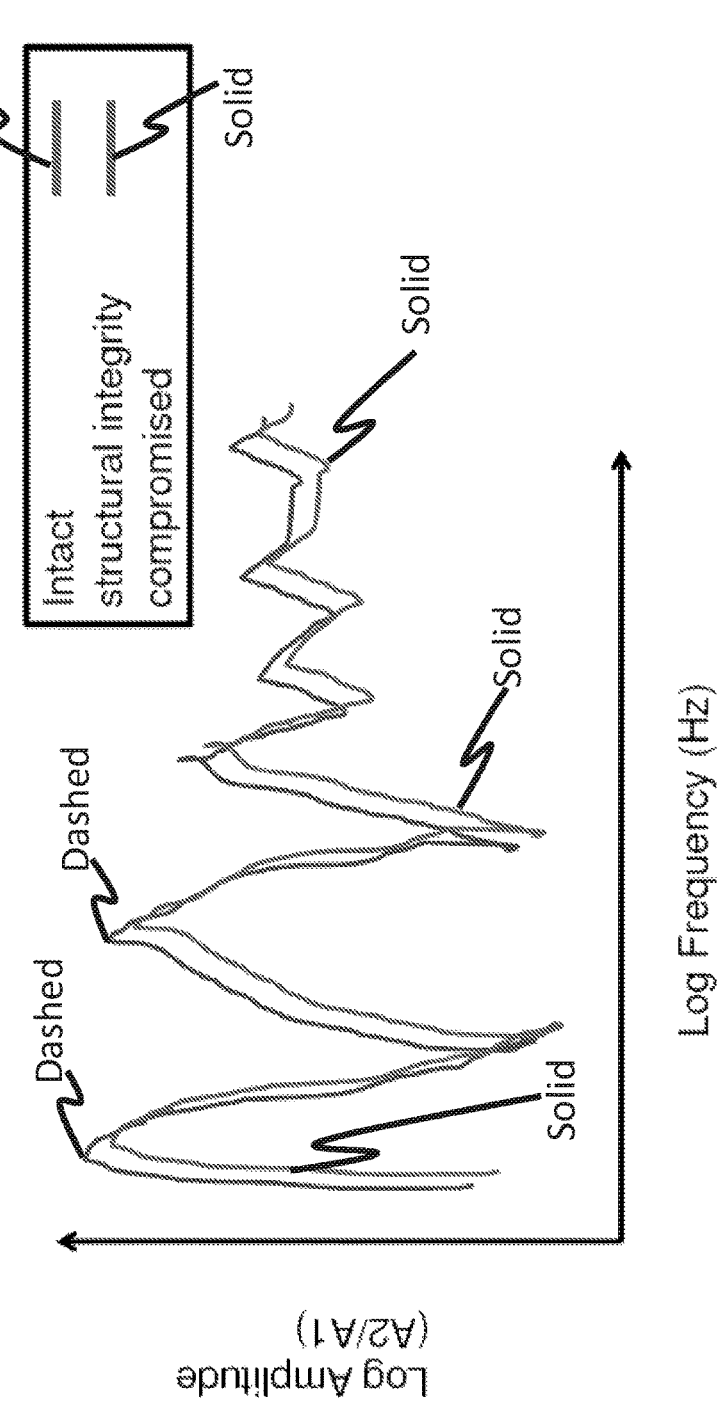
FIG. 4 is a graphical representation of a plot showing a comparison of ratios of signals provided by two different sensors in accordance with an exemplary embodiment of the invention.

Turning now to FIG. 4, a graphical representation of a first exemplary technique of monitoring system health in accordance with the invention is shown. In this example, the sensor(s) communicate information and/or signals to the processor. The processor computes a transfer function ("TF") estimate using signal averaging of the signals. The transfer function represents a relationship between the two signals measured by the sensors. A frequency domain curve fitting (e.g., using Rational Fraction polynomial) may be employed to provide accuracy of the TF estimate, for example to compensate for noise in the system. The processed signal allows for the processor to mathematically determine a baseline condition that reflects normal operating conditions. If the structural health of the system is compromised, a deviation from the baseline measurement will arise and thus changes in the processed signal (or the actual signal) can indicate a change in the structural health of the system. Changes in drive performance (motor performance) such as when ramping up and ramping down do not alter the transfer function; thus, the transfer function will only change when the fundamental characteristics of the energy carrying path, i.e., the tension member, changes.

The graphical representation shown in FIG. 4 depicts a comparison of ratios of signals provided by the sensors as computed by the processor. As shown, the x-axis of the plot of FIG. 4 is the Log of Frequency as measured in Hz by the sensors. The y-axis is the Log of Amplitude of the ratio of the amplitude of the signals provided by the sensors. For example, a first sensor may output amplitude $A_1$ and a second sensor may output amplitude $A_2$. The Log of the ratio $A_2/A_1$ of the amplitudes may then be plotted against the Log Frequency.

The processor then compares the computed signal ratio (which may be over time or instantaneous) against known quantities, such as known waveforms or baseline measurements. Known waveforms represent a known signal or state of operation of the system and can represent "healthy" systems or "unhealthy" systems, whereas a baseline is a system specific determined waveform of a healthy system or the actual system as installed. Hereinafter, the baseline and the predetermined waveforms will be referred to as known waveforms or known quantities. Known quantities and known waveforms may be analytically determined. In some embodiments, a baseline signal or waveform can be measured and/or set when a technician is present and the system is first activated. In this embodiment it may be known that the system is in good health, and an accurate representation of the waveforms generated by a healthy system. Accordingly, the baseline waveform may be based on the exact system to be monitored. In other embodiments, a baseline or known waveform may be based on collective data that represents average waveforms that have been determined in real-world observations from one or more other systems, or may be based on simulations of the systems.

Graphically shown in FIG. 4, the solid line represents the ratio of the signals measured by the sensors of the drive system and the dashed line represents a known healthy system waveform. As shown, the detected signal deviates from the known waveform. When the comparison is a deviation from a healthy waveform the processor will determine that the structural health of the monitored drive system is compromised. The processor will then perform a safety response action, such as performing a power shut-down function of the entire system.

Figure 5:
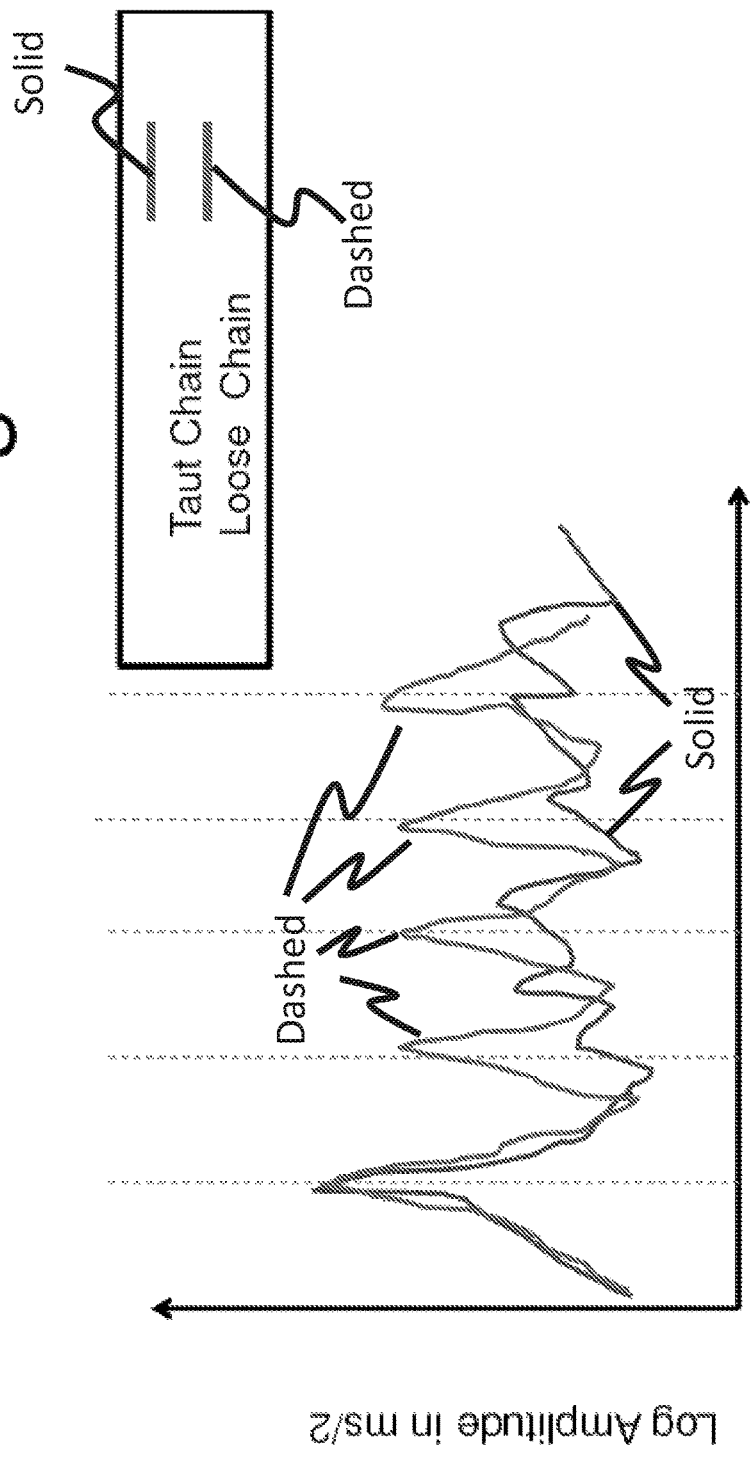
FIG. 5 is a graphical representation of exemplary operating signals in accordance with an alternative exemplary embodiment of the invention.

Turning now to FIG. 5, a graphical representation of an alternative exemplary technique is shown. In the embodiment of FIG. 5, only one sensor is monitored by the processor. The technique represented by FIG. 5 represents a one-sensor system, or, alternatively, may be used in a system where one of the sensors breaks and/or fails. In FIG. 5 the x-axis is again Log Frequency, with the vertical dashed lines of FIG. 5 representing integer multiples of operational harmonic frequencies of the drive system. The y-axis is the Log Amplitude, in meters per second squared, $(m/s^2)$, of the signal. In this embodiment, the plot represents the Fast Fourier Transform (FFT) of the signal measured by the sensor.

A plot of a "healthy" tension member is shown by the solid line and a plot of an "unhealthy" tension member is shown by the dashed line. As shown in FIG. 5 a healthy tension member does not produce peaks of significant amplitude at harmonics beyond the first harmonic. However, an unhealthy tension member generates peaks of significant amplitude at harmonics above the first harmonic. In this embodiment, the processor may look for consistent peaks above a threshold at the harmonics in the single sensor scenario shown in FIG. 5, to determine the structural health of the drive system. In alternative embodiments, the processor may look for other features in the waveforms, transfer functions, or signals provided to the processor. For example, the processor may look for troughs or significant troughs in the waveforms, for patterns of peaks and/or troughs, wavelengths, frequencies, repeating patters or chaotic signals, etc., without departing from the scope of the invention.

As described above, the techniques described monitor for deviation from a known healthy waveform or for trends exhibited by known unhealthy systems. However, in alternative embodiments, the processor can compare the measured signal(s) against known unhealthy waveforms. Then, when the measured signal matches a known unhealthy waveform, or indicates a tendency toward an unhealthy waveform, the safety response action can be performed. Furthermore, a combination of monitoring for a deviation from a known healthy waveform and monitoring for matching to a known unhealthy waveform may be employed. Moreover, the above described techniques are merely provided as examples, and other techniques and/or methods may be employed without departing from the scope of the invention.

Advantageously, embodiments of the invention provide an objective measure of the structural health of a drive system. For example, human inspection, which may involve human error and subjective measuring, can be eliminated. Advantageously, a more accurate determination of the structural health of a drive system may be determined through the accuracy of the sensors, rather than human measurements, and such information may be used to identify potential failure and take preventive actions. Moreover, advantageously, systems disclosed herein can provide continuous and/or instantaneous monitoring of structural health, rather than having the drive systems only monitored when a human inspector is available. Additionally, a safety response action may be performed immediately upon determination of an unhealthy drive system, thereby preventing injury and/or damage to users or to the drive system. In some embodiments the monitoring provided by the systems disclosed herein may be communicated remotely to a monitoring center or system. Further, in some embodiments, the response to the detection of a failing drive system may be automated, such that upon detection of an unhealthy operating condition, the processor of the system can perform or direct other systems to perform actions to prevent failure of the driven system.

Moreover, advantageously, in some embodiments, an early warning signal for an impending failure of the drive system can be provided. When the monitoring system is employed, if a comparison to known waveforms, as described above, is made, a notification can be provided that failure is possible, and a technician can be notified to make a repair, prior to critical or catastrophic failure.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

For example, the sensors used to monitor the structural health of the tension member through the drive members are not required to be accelerometers. Alternative sensors may include resistance temperature detectors, thermocouples, non-contact eddy current probe displacement sensors, contact linear variable displacement transducers, velocity sensors, strain sensors, load sensors, pressure sensors, microphones, optical sensors, non-contact chain vibration measurement devices such as cycling power meters, and/or other types of sensors that are known or will become known that may be configured to monitor the structural health of the drive system. Further, as is apparent from this exemplary list of alternative sensors, it is not a requirement of the invention that the sensor be physically connected to the drive member(s), but rather may be located remote from the drive members. For example, when using optical sensors, the sensors may be separate and spaced away from the drive members, which may allow for easy installation or may be more appropriately used depending on the particular configuration of the drive system that is to be monitored. Moreover, although described herein as a separate processor and sensor, in alternative configurations, the processor may be integrated with the sensor into a single device.

Moreover, as described above, the first and second drive members are substantially the same. However, the drive members may be different or may define different sizes or dimensions depending on the needs and design of the drive mechanism and device to be driven.

Additionally, in some embodiments, described above, the processor is configured to perform the safety response action. However, in alternative embodiments, the processor may be configured to communication with other components, such as a motor controller. In this configuration, the processor may send an instruction to the motor controller, and the motor controller will perform the power shut-down of the drive system. Accordingly, the device or component configured to carry out the safety response action is not limited by the present disclosure, as those of skill in the art will appreciate that various configurations and/or control systems can be used to perform safety response actions without departing from the scope of the invention.

Furthermore, although described herein with respect to a drive mechanism of an escalator, the structural health monitoring system disclosed herein may be applied to any system incorporating a drive mechanism having a drive member and tension member, for example, in the automotive, HVAC, appliance, and similar fields.

What is claimed is:

1. A structural health monitoring system comprising:
a drive system of an escalator or moving walkway comprising:
a first drive member;
a second drive member operationally connected to the first drive member; and
a tension member operationally connecting the first drive member to the second drive member;
at least one first sensor configured to monitor a characteristic of the first drive member;
a processor in communication with the at least one sensor and configured to determine if the structural health of the tension member is compromised based on the monitored characteristic, the processor further configured to perform a safety response action when the structural health of the tension member is determined to be compromised, and
at least one second sensor configured to monitor a characteristic of the second drive member,
wherein the processor is configured to monitor a transfer function between the first and second drive members to determine if the structural health of the tension member is compromised, wherein the transfer function comprises signal averaging of signals received from the at least one first sensor and the at least one second sensor and wherein frequency domain curve fitting is employed to compensate for noise in the system.

2. The structural health monitoring system of claim 1, wherein the at least one first sensor is disposed on or located proximal to the first drive member.

3. The structural health monitoring system of claim 1, further comprising a motor operationally connected to at least one of the first drive member and the second drive member.

4. The structural health monitoring system of claim 1, wherein the first drive member and the second drive member each comprise a sheave, a pulley, a gear, a wheel, a sprocket, a cog, or a pinion.

5. The structural health monitoring system of any of claim 1, wherein the tension member comprises a chain, a belt, a cable, a ribbon, a band, or a strip.

6. The structural health monitoring system of claim 1, wherein the at least one first sensor and the at least one second sensor each comprise an accelerometer, a resistance temperature detector, a thermocouple, a non-contact eddy current probe displacement sensor, a contact linear variable displacement transducer, a velocity sensor, a strain sensor, a load sensor, a pressure sensor, a microphone, or a non-contact chain vibration measurement device.

7. The structural health monitoring system of claim 1, wherein the safety response action comprises at least one of powering off the drive system, providing a displayed notification on a display screen, transmitting a notice to an external device, and providing an indicator light and/or sound indicating that the structural health of the drive system is compromised.

8. The structural health monitoring system of claim 1, wherein the processor and the at least one sensor form a single device.

9. A structural health monitoring system comprising:
a drive system of an escalator or moving walkway comprising:
a first drive member;
a second drive member operationally connected to the first drive member; and
a tension member operationally connecting the first drive member to the second drive member;
at least one first sensor configured to monitor a characteristic of the first drive member;
at least one second sensor configured to monitor a characteristic of the second drive member; and
a processor in communication with the first and second sensors and configured to measure and monitor a transfer function between the first and second drive members to determine if the structural health of the drive system is compromised, wherein the processor is configured to monitor a transfer function between the first and second drive members to determine if the structural health of the tension member is compromised, wherein the transfer function comprises signal averaging of signals received from the at least one first sensor and the at least one second sensor and wherein frequency domain curve fitting is employed to compensate for noise in the system.

10. The structural health monitoring system of claim 9, wherein the processor is configured to perform a safety response action when the structural health of the drive system is determined to be compromised.

11. A method of monitoring the structural health of an escalator or moving walkway drive system, the drive system includes a first drive member, a second drive member, and a tension member operationally connecting the first and second drive members, the method comprising:
  measuring a characteristic of at least one of the first and second drive members;
  determining if the structural health of the tension member is compromised based on the measured characteristic; and
  performing a safety response action when it is determined that the structural health of the tension member is compromised,
  wherein the measuring step comprises measuring a transfer function between the first drive member and the second drive member based on the measured characteristic, wherein the transfer function comprises signal averaging of signals received from the at least one first sensor and the at least one second sensor and wherein frequency domain curve fitting is employed to compensate for noise in the system.

12. The method of claim 11, wherein the determining step comprises comparing the measured characteristic to a known quantity.

13. The method of claim 12, wherein the known quantity is analytically determined.

14. The method of claim 12, wherein the known quantity is a measured characteristic of the structural health of the tension member when the tension member is known to be healthy.

* * * * *